United States Patent
Ross, Jr. et al.

(10) Patent No.: US 6,216,534 B1
(45) Date of Patent: Apr. 17, 2001

(54) LIQUID LEVEL GAUGE WITH HINGED FLOAT ARM

(75) Inventors: Herbert G. Ross, Jr., Arglye; Agoston Horvath, Plano, both of TX (US)

(73) Assignee: Rochester Gauges, Inc., Dallas, TX (US)

( * ) Notice: Subject to any disclaimer, the term of this patent is extended or adjusted under 35 U.S.C. 154(b) by 0 days.

(21) Appl. No.: 09/141,504

(22) Filed: Aug. 28, 1998

(51) Int. Cl.$^7$ .............................. G01F 23/30; G01F 23/32; G01F 23/36
(52) U.S. Cl. ................................ 73/317; 73/305; 73/309; 73/313; 73/290 R; 116/229
(58) Field of Search ............................ 73/317, 305, 306, 73/309, 313, 314, 315, 318, 319, 320, 321, 322, 322.5; 116/229

(56) References Cited

U.S. PATENT DOCUMENTS

| | | | |
|---|---|---|---|
| 1,634,165 | * | 6/1927 | Williams .................................. 73/313 |
| 2,551,792 | * | 5/1951 | De Giers et al. ....................... 73/317 |
| 2,992,560 | | 7/1961 | Morgan et al. ......................... 73/317 |
| 3,463,843 | | 8/1969 | Taylor et al. ............................ 264/68 |
| 3,688,795 | | 9/1972 | Taylor .................................... 137/558 |
| 4,483,367 | | 11/1984 | Ross, Jr. et al. ..................... 137/416 |
| 4,641,122 | * | 2/1987 | Hennequin .............................. 338/33 |
| 4,667,711 | | 5/1987 | Draft ..................................... 141/198 |
| 4,991,436 | | 2/1991 | Roling .................................... 73/320 |
| 5,072,618 | | 12/1991 | Taylor et al. ........................... 73/317 |
| 5,085,078 | * | 2/1992 | Baux et al. ............................. 73/313 |
| 5,272,918 | | 12/1993 | Gaston et al. ..................... 73/290 R |
| 5,357,815 | | 10/1994 | Williamson ........................ 73/866.3 |

OTHER PUBLICATIONS

Rochester Gauges, Inc., Industrial Liquid Level Gauges, Specifications Brochure, 12 pages (undated).
Rochester Gauges, Inc., Magnetic Liquid–level Gauges for LP–Gas Service, Series 7200, Product Brochure, 2 pages, May 27, 1992.
Rochester Gauges, Inc., Rough Rider Advertisement, 1 page (undated).
Rochester Gauges, Inc., Drawing No. M6339–11, 1 page, Mar. 12, 1973.

\* cited by examiner

*Primary Examiner*—Hezron Williams
*Assistant Examiner*—Dennis E Loo
(74) *Attorney, Agent, or Firm*—Sidley & Austin (57) ABSTRACT

A float-type liquid level gauge (20) is provided for measuring the level of a liquid within a storage tank (22). The gauge includes a gauge head (30) adapted for mounting to a portion of liquid storing container, a support arm (32) connected to the gauge head and depending therefrom into the tank, a float arm (34) including an elongate inner arm section (46), an elongate outer arm section (48) and a hinge section (50), and a float (36) connected to the outer end of the float arm. The inner section of the float arm is pivotally connected to the support arm for movement through an arc defining a first plane. The hinge section is connected at a first end to an outer end of the inner arm section and connected at an opposite end to the inner end of the outer arm section. The hinge section is deflectable to allow movement of the outer arm section between a first configuration in which the outer arm section is in a predetermined position with respect to the inner arm section, and a second configuration in which the outer arm section is not in the predetermined position. The hinge section provides a biasing force for urging the outer arm section into the first configuration. This arrangement allows the outer arm section to temporarily deflect with respect to the inner arm section to avoid damage if the float or float arm encounters an obstacle as the gauge is being installed in the storage tank.

26 Claims, 4 Drawing Sheets

LIQUID LEVEL GAUGE WITH HINGED FLOAT ARM

TECHNICAL FIELD OF THE INVENTION

This invention relates to liquid level gauges of the type having a float arm which pivots to allow a buoyant float to remain at the surface of the liquid. In one aspect, it relates to a gauge having a float arm that is hinged to allow an outer float arm section to temporarily deflect with respect to an inner float arm section.

BACKGROUND OF THE INVENTION

Liquid level gauges of the type having a buoyant float mounted on a pivoting float arm which responds to changes in the liquid level being measured are well known. Such pivoting float-type gauges typically utilize mechanical or electrical mechanisms that sense the angular position of the float arm with respect to a stationary support arm or other structure. The mechanism then provides an external indication of the corresponding liquid level. Since the liquid level indication is based on a measurement of the angle between the float arm and another structure, it is important that the float arm have a known configuration in the plane of pivoting motion in order to preserve the accuracy, precision and calibration of the gauge.

The measurement range of a typical pivoting float-type gauge depends (in part) upon the range of vertical positions which can be reached by the float's arc of motion (any liquid level above or below the float's range of travel being unmeasurable). It is therefore often desirable to make the float arm as long as possible consistent with providing sufficient clearance for the float to pivot.

In some applications, for example, on pressurized tanks used for storing liquids such as liquefied petroleum gas (often referred to generally as "LPG"), the liquid level gauge is provided with a threaded gauge head for mounting into a threaded pressure fitting on the tank. In such cases, the float, float arm, support arm and other in-tank components of the gauge are inserted through a passage in the threaded fitting on the tank. The entire gauge is then rotated to cause the threaded gauge head to engage the threaded fitting and form a pressure-type seal.

It is known that pivoting float-type gauges can be damaged during installation if the float or float arm strikes the interior walls of the tank or other stationary objects as the gauge is being screwed into the threaded tank fitting. Since the float arm typically hangs downward in an empty tank such damage is unlikely if the gauge is slowly screwed into the fitting by hand or using a manual wrench, as was common industry practice in the past. However, it has now been discovered that power wrenches are increasingly being used for installing screw-in float type gauges into tanks. Power wrenches typically spin the gauge much faster and with more force during installation than a manual wrench. The centrifugal force that results from rapid spinning of a gauge during installation can cause the float and float arm to rapidly swing from a downward, generally vertical position to a laterally extending, generally horizontal position. In many cases, and especially where the storage tank is narrow and/or where the gauge is installed near the sidewall of the tank, the revolution of a horizontally oriented float arm about a vertical axis such as the support arm can result in the float or float arm striking the walls or other interior components of the tank. If the float arm strikes the interior of the storage tank (especially if it is being rotated by a power wrench), this can result in damage to the float, bending of the float arm, damage to the float arm pivot mechanism, twisting of the support arm, or other damage which can adversely affect the calibration, accuracy and/or precision of the gauge. A need therefore exists, for a pivoting float-type liquid level gauge having a float arm that will not be damaged if an obstacle is encountered in the interior of the tank during installation. A need further exists, for a pivoting float-type gauge having a mechanism which retains its accuracy and calibration if the float arm encounters an obstacle during installation.

SUMMARY OF THE INVENTION

In accordance with one aspect of the current invention, a liquid level gauge is provided comprising a gauge head, a support arm, a float arm, and a float. The gauge head is adapted for mounting to a portion of a liquid storing container. The support arm is rigidly connected to the gauge head and depends therefrom. The float arm includes an elongate inner arm section, an elongate outer arm section, and a hinge section. The inner arm section is pivotally connected to the support arm at a pivot point for movement through an arc defining a plane of motion. The hinge section is connected at a first end to the inner arm section and connected at an opposite end to the outer arm section. The hinge section is deflectable to allow movement of the outer arm section between a first configuration in which the outer arm section is in a predetermined position with respect to the inner arm section, and a second configuration in which the outer arm section is not in the predetermined position with respect to the inner arm section. Further, the hinge provides a biasing force for urging the outer arm section into the first configuration. The float is connected to an outer end of the outer arm section and is buoyant so as to remain at the surface of the liquid.

In one embodiment of the current invention, the hinge section of the float arm comprises a close wound cylindrical helical extension spring having an initial tension when in an unflexed condition. In another embodiment of the current invention, the hinge section comprises first and second guide members having an elastic member connected therebetween. Each guide member includes a longitudinally oriented body portion and a terminal portion. Each terminal portion is disposed at one end of the body portion and defines a mating surface facing away from the body portion and generally perpendicular to the longitudinal direction. Each guide member further defines a passage formed through the mating surface and extending into the body portion to an anchor point. The elastic member has a first end secured to the anchor point of the first guide member, extends through the passages in the first and second guide members, and has a second end secured at the anchor point of the second guide member. The elastic member provides a biasing force for urging the mating surfaces into juxtaposition. The elastic member can be a cylindrical helical extension spring held in tension when the mating surfaces are juxtaposed.

In yet another embodiment of the current invention, the hinge section comprises a flat leaf spring. The spring has a rectangular cross-section with a thickness and a width, the thickness being smaller than the width. The spring is connected to the inner arm section such that during use, the width is oriented in a substantially vertical direction. In a further embodiment of the current invention, the hinge section comprises a first hinge member and a second hinge member pivotally connected to one another to allow relative movement along a line of motion. The hinge members are connected to the inner arm section such that during use, the line of motion is oriented in a substantially horizontal direction. The hinge section further includes an elastic member connected between the arm sections and providing a biasing force for urging the outer arm sections into the first configuration. The elastic member of this embodiment may be an elastomer sleeve having a bore and being connected to each arm section with the hinge members being positioned within the bore.

In yet another aspect of the current invention, a float arm for a liquid level gauge having a support member and a float is provided. The float arm comprises an elongate inner arm section, a hinge section, and an elongate outer arm section. The inner arm section has an inner end and an outer end. The inner end is adapted for pivotal connection to the support member and the outer end is connected to a first end of the hinge section. The outer arm section has an inner end and an outer end. The inner end is connected to a second end of the hinge section and the outer end is adapted for connection to the float. The hinge section is deflectable to allow movement of the outer arm section between a first configuration in which the outer arm section is in a predetermined position with respect to the inner arm section, and a second configuration in which the outer arm section is not in the predetermined position with respect to the inner arm section. The hinge section provides a biasing force for urging the outer arm section into the first configuration.

In one embodiment of this invention, the hinge section comprises a close wound cylindrical helical extension spring having an initial tension. In another embodiment, the hinge section comprises a single leaf flat spring. In still further embodiments, other configurations for the hinge section are provided.

BRIEF DESCRIPTION OF THE DRAWINGS

A more complete understanding of the invention and its advantages will be apparent from the following detailed description when taken in conjunction with the accompanying drawings in which.

DETAILED DESCRIPTION

Figure 1:
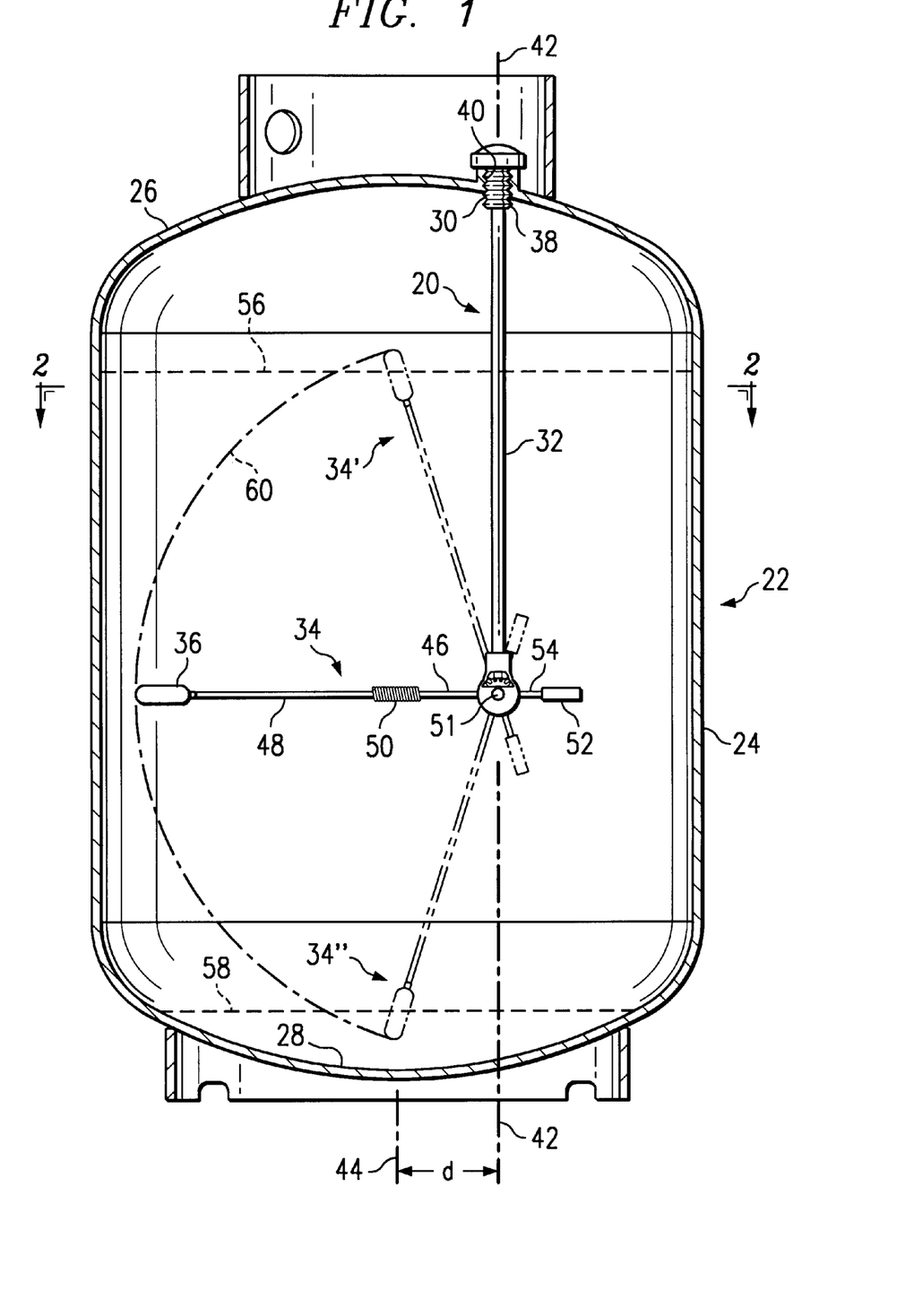
FIG. 1 is a side view in partial cross-section of a storage tank having a liquid level gauge according to one embodiment of the current invention installed therein.

Referring now to the drawings wherein like referenced characters designate like or corresponding parts throughout several views, several embodiments of the liquid level gauge of the present invention are illustrated. Referring first to FIG. 1, liquid level gauge 20 is shown installed in a storage tank 22 having a cylindrical sidewall 24 and curved top and bottom walls 26 and 28, respectively. The tank 22 is typical of the type used for storing pressurized liquids such as LPG. The gauge 20 includes a gauge head 30, a support arm 32, a float arm 34, and a buoyant float 36. The gauge head 30 is adapted for mounting to a portion of the tank 22. In the embodiment shown in FIG. 1, for example, threads 38 are provided on the gauge head 30 which can be screwed into a threaded opening 40 provided on the top wall 26 of the tank. The threads 38 on the gauge head 30 will define a mounting axis 42 for the gauge 20, i.e., the axis about which the gauge 20 will rotate as the head 30 is being screwed into the threaded opening 40 of the tank. A mounting structure such as threaded opening 40 is often located along the center line of the tank, however, such symmetrical mounting is not required. For example, as seen in FIG. 1, in this embodiment the threaded opening 40 is offset from the longitudinal axis 44 of the tank by a distance d. While the embodiment shown in FIG. 1 utilizes a threaded gauge head for mounting to the tank, it will be apparent that other mounting structures known in the art, including bolted and flanged connections, can also be used without departing from the scope of the current invention.

The support arm 32 of the gauge 20 is rigidly connected to the gauge head 30 and extends from the gauge head into the interior of the tank 22. Typically, the support arm 32 will extend from the gauge head 30 along the mounting axis 42 as shown in FIG. 1, however, other configurations for the support arm 32 can be used without departing from the scope of the current invention.

The float arm 34 includes an elongate inner arm section 46, an elongate outer arm section 48, and a hinge section 50. The inner arm section 46 is pivotally connected to the support arm 32 at a pivot point 51 for movement through an arc defining a first plane. The hinge section 50 is connected at a first end to outer end of the inner arm section 46 and connected at an opposite end to an inner end of the outer arm section 48. As discussed in greater detail below, the hinge section 50 is deflectable to allow the outer arm section 48 to move with respect to the inner arm section 46. In addition, the hinge section 50 provides a bias force which urges the outer arm section 48 into a predetermined position with respect to the inner arm section 46.

Referring still to FIG. 1, the float 36 is buoyant so that it will float on the surface of the liquid whose level is to be measured. If necessary, a counterweight 52 can be provided as is known in the art on an extension 54 of the float arm 34 which extends from the pivot point 51 in the opposite direction from the float 36. The float 36 thus moves in response to changing levels of liquid within the tank, causing the attached float arm 34 to pivot within its plane of motion. A mechanism in the gauge detects the angular position of the inner arm section 46 of the float arm with respect to the support arm 32, and produces an indication of the liquid level corresponding to this angular position. To maintain the calibration of the gauge and its measurement precision, the float 36 (and hence the outer arm section 48) must be in a predetermined position with respect to the inner arm section 46 of the float arm 34. For example, the float arm 34 shown in FIG. 1 has a first configuration in which the center of float 36 is longitudinally aligned with the inner float arm section 46 and at a fixed distance from the pivot point 51. As the liquid in the tank moves from the highest measured level (denoted by reference number 56) to the lowest measured level (denoted by reference number 58), the float arm will move along an arc of motion 60 between a highest position 34' (shown in phantom) and a lowest position 34" (shown in phantom). Note, however, that at the highest and lowest levels, as well as throughout the range of motion, the float 36 and outer arm section 48 must remain in the first configuration, i.e., with the outer arm section in same position relative to the inner arm section 46, to preserve calibration and accuracy of the gauge. In other words, when the float arm is at the position denoted by 34', the float will be longitudinally aligned with the inner arm section 46 and located at the same fixed distance from the pivot point 51 as at the position denoted by 34, and when the float arm is at the position denoted by 34" the float 36 will still be longitudinally aligned with the inner arm section 46 and at the same fixed distance from the pivot point.

In the embodiment shown in FIG. 1, the overall measurement range desired for the gauge 20 (i.e., the distance between the highest measured liquid level 56 and the lowest measured liquid level 58) requires a float arm 34 having an effective length (i.e., the distance from the pivot point 51 to the center of the float 36) which is greater than the radius of tank 22. It will be readily apparent that this necessitates that the gauge 20 have a mounting axis 42 which is offset from tank axis 44 so that, after installation, the float arm 34 and float 36 can move along the arc of motion 60 without striking the interior of sidewall 24.

Figure 2:
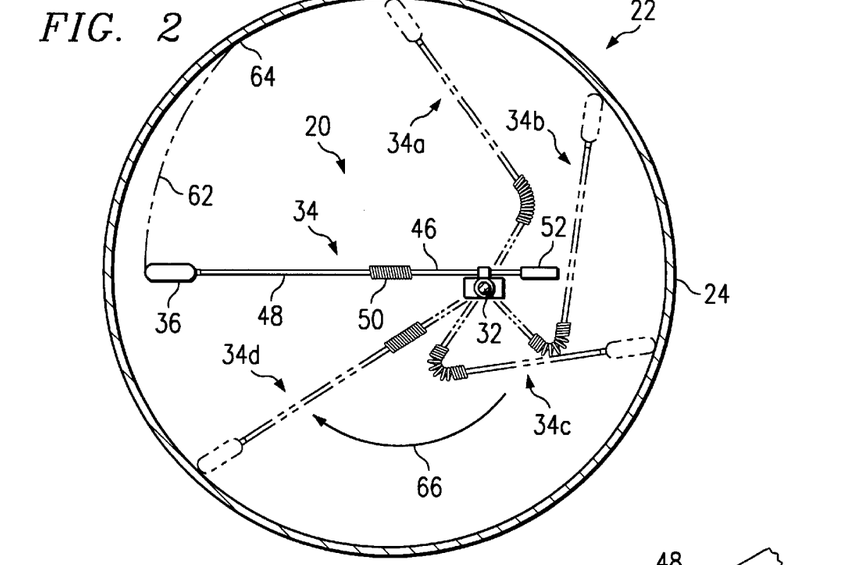
FIG. 2 is a top view of the tank and gauge of FIG. 1 taken along line 2—2 of FIG. 1. Selected alternative positions of the float arm which can occur as the gauge is being screwed into the tank are shown in phantom.

Referring now also to FIG. 2, a cross-sectional top view of the gauge 20 and the tank 22 from FIG. 1 is shown. During installation of the gauge 20 into the tank 22, the float arm 34 and other in-tank components will revolve around the mounting axis 42 as the threaded head 30 is screwed into the threaded opening 40. In the case shown in FIG. 2, this means that the float arm 34 will revolve around support arm 32 in the clockwise direction (viewed from above). If the float arm 34 is in the horizontal orientation shown, for example if the gauge is being spun rapidly during installation, then the end of the float 36 will follow the path denoted by reference numeral 62 until it strikes the sidewall 24 at the point denoted by reference numeral 64. If the float arm 34 of the gauge was rigid, then further revolution of the float arm past point 64 would likely result in permanent bending of the float arm, bending of the support arm 32, damage to the pivot mechanism or other problems as previously discussed. However, in the current invention, the hinge section 50 of the float arm 34 is deflectable to allow the outer arm section 48 (and hence the attached float 36) to move with respect to the inner arm section 46. Float arms 34a, 34b and 34c (all shown in phantom) illustrate how the deflectable hinge section 50 temporarily bends to allow the outer arm section 48 to move with respect to the inner arm section 46 when there is in insufficient clearance for the float arm in its first configuration (as denoted by reference numeral 34) to revolve around the support arm 32 during installation. As the revolution of the float arm 34 about the support arm 32 continues, the float 36 will eventually lose contact with the sidewall 24, for example as the inner arm section 46 passes the position shown for arm 34c or as the float arm moves from a horizontal position. Once the float 36 is no longer contacting the sidewall 24, then the bias force provided by the hinge section 50 will cause the outer arm section 48 to return to its original position with respect to inner arm section 46. For example, in the case shown in FIG. 2, the bias force provided by the hinge section 50 will cause the float arm 34 to move rapidly (as indicated by arrow 66) from the configuration denoted by reference numeral 34c back into the first configuration denoted by reference numeral 34d (identical to the configuration denoted by 34). Since the biasing force provided by the hinge section 50 will always cause the outer arm section 48 which carries the float 36 to move into predetermined position with respect to the inner arm section 46, then the original calibration, accuracy and precision of the gauge 20 will be preserved.

Figure 3:
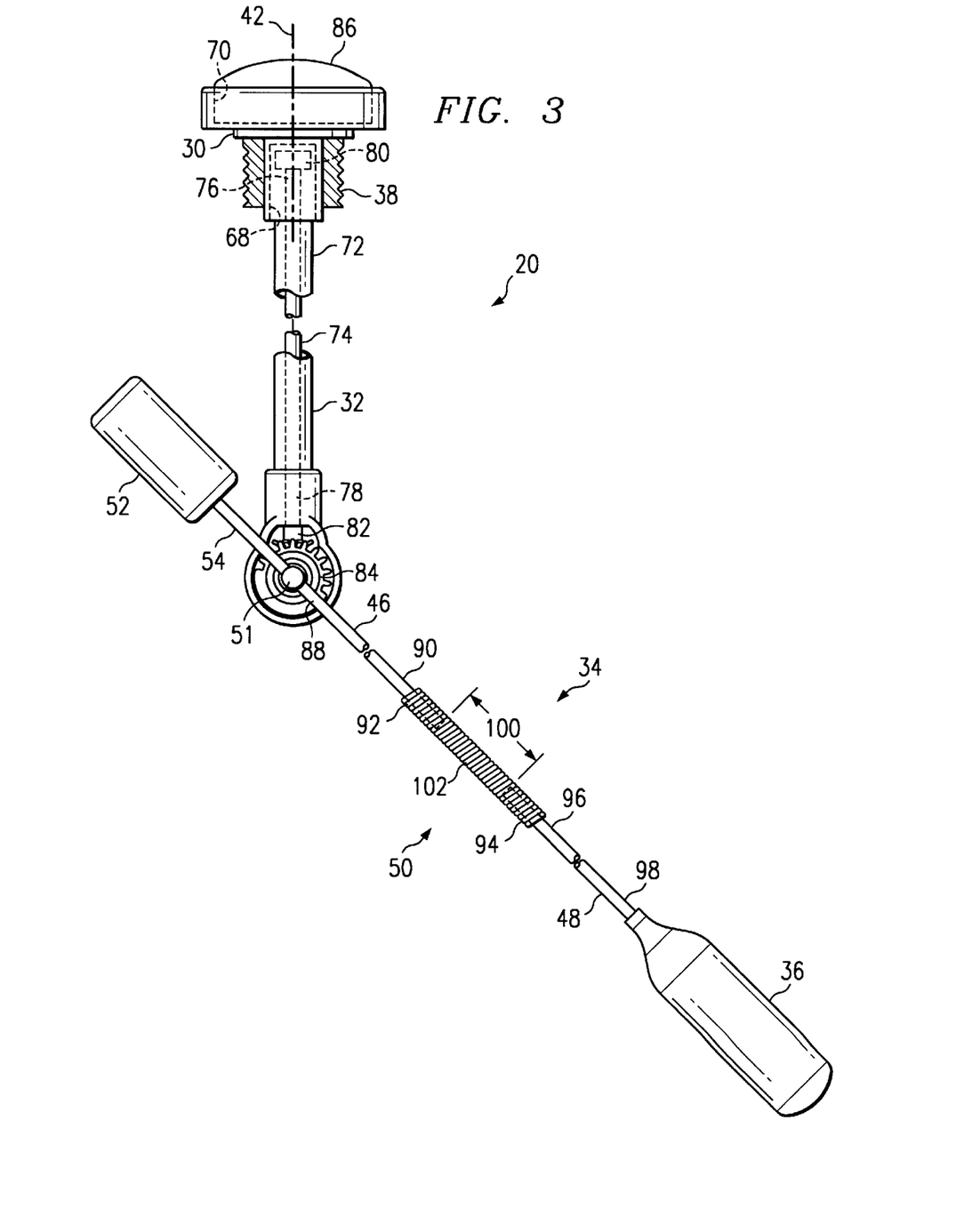
FIG. 3 is an enlarged side view with portions broken away of the liquid level gauge of FIG. 1.

Referring now to FIG. 3, additional details of a preferred embodiment of the current invention are shown. As previously discussed, the gauge 20 includes a gauge head 30, a support arm 32 rigidly attached to the gauge head, and a pivot arm 34 which is pivotally attached to the support arm at a pivot point 51. In this embodiment, the gauge head 30 has a threaded portion 38 adapting the gauge for screw-in mounting into the threaded fitting of a tark and defining a mounting axis 42 about which the gauge must be rotated when screwing the threaded portion into the tank. The gauge head 30 in this embodiment also includes a lower cavity 68 and an upper cavity 70 which are formed on the lower and upper sides, respectively, of the gauge head. In this embodiment, the upper end 72 of the support arm 32 is press-fit into the lower cavity 68 to rigidly connect the support arm to the gauge head 30. However, other connection methods known in the art can be used. A drive shaft 74 is mounted to the support arm 32 to allow rotation about the longitudinal axis of the shaft. In the embodiment shown, the support arm 32 is a tubular member which allows the drive shaft 74 to be completely enclosed therewithin. However, other configurations for the support arm 32, including a square tubular member, an U-shaped channel, an I-shaped channel, and a flat plate could be used without departing from the scope of the current invention since methods for mounting the drive shaft 74 to such alternative support arms are readily known in the art. The drive shaft 74 has a first end 76 disposed within the lower cavity 68 of the gauge head 30, and a second end 78 disposed near the pivot point 51 where the float arm 34 is connected to the support arm 32. A magnet 80 is fixed on the first end 76 of the drive shaft 74 to rotate with the shaft, and a first gear 82 is fixed on the second end 78 of the drive shaft to rotate with the shaft. A second gear 84 is located at the pivot point 51 and fixed to the inner arm section 46 of the float arm 34 to pivot with the inner arm section. The first and second gears 82, 84 each have a plurality of teeth which are operably engaged such that the rotation of the second gear 84 (caused by angular movement of the inner arm section 46 as it pivots about the pivot point 51) produces a corresponding rotation of the first gear 82 and accordingly, of the drive shaft 74 and the magnet 80. A magnetically coupled indicator dial 86 as is known in the art can be mounted in the upper cavity 70 of the gauge head 30. The indicator dial 86 can include a magnetic indicator (not shown) which is responsive to the movement of the nearby magnet 80 located in the lower cavity 78 of the gauge head 30, whereby angular movement of the inner arm section 46 of the float arm is indicated outside of the tank by the indicator 86. Such magnetically coupled mechanisms are particularly well suited for use in LPG applications. However, other indicating mechanisms, including pure mechanical, optical and electrical couplings as are known in the art, can be used without departing from the scope of the current invention.

Referring still to FIG. 3, an important aspect of the current invention is the float arm 34 having a deflectable hinge section 50, for which further details will now be provided. The float arm 34 includes an elongate inner arm section 46 having an inner end 88 and an outer end 90. As previously discussed, the inner end 88 is adapted for pivotal connection to the support member 32 at pivot point 51. The hinge section 50 is connected at a first end 92 to the outer end 90 of the inner arm section 46. The elongate outer arm section 48 has an inner end 96 and an outer end 98. The inner end 96 is connected to a second end 94 of the hinge section 50 and the outer end 98 is connected to the float 36. The hinge section 50 is deflectable to allow movement of the outer arm section 48 between a first configuration in which the outer arm section is in a predetermined position with respect to the inner arm section 46, and a second configuration in which the outer arm section is not in the predetermined position with respect to the inner arm section. The hinge section 50 also provides a biasing force for urging the outer arm section 48 into the first configuration. For the embodiment shown in FIG. 3, the first configuration constitutes the outer arm section 48 being longitudinally aligned with the inner arm section 46 with the proximate ends 90, 96 being spaced apart by a fixed distance denoted by reference numeral 100. Examples of the second position for this embodiment are shown by the float arm configurations denoted by reference numerals 34a, 34b and 34c of FIG. 2, wherein the outer arm section 48 is not longitudinally aligned with the inner arm section 46. Thus, it should be noted that for any particular embodiment of the current invention, the first configuration will be a single specified predetermined position of the outer arm section 48 relative to the inner arm section 46, while the second configuration can constitute a range of positions for the outer arm section with respect to the inner arm section. Further, it will be readily understood that the outer arm section 48 can move along its arc of motion (e.g., for example when the liquid level in the tank changes) while remaining in the first configuration since the first configuration is determined only by the position of the outer arm section 48 relative to the inner arm section 46, not by the absolute position of the outer arm section or by the position of the outer arm section with respect to the tank 22 or any other structure. It is not necessary that the arm sections 46, 48 of the current invention be straight as shown in FIG. 3. In other embodiments (not shown) the inner and/or outer arm sections can comprise curved or angled members, provided the arm sections can move from some predetermined first configuration into another, different configuration when the hinge section is deflected.

In the embodiment shown in FIG. 3, the hinge section 50 comprises a close wound cylindrical helical extension spring 102 having a cylindrical bore and an initial tension. The term "close wound" indicates that the coils of the spring 102 are touching one another when the spring is in an unflexed condition. The term "initial tension" is used to define a force or a load, typically measured in pounds or ounces, which presses the coils of a close wound extension spring against one another. This force must be overcome before the coils of a spring begin to open up. It is known in that art that initial tension can be wound into extension springs by bending each coil as it is wound away from its normal plane, thereby producing a slight twist in the wire which causes the coil to spring back tightly against the adjacent coil. The proximate ends 90, 96 of the arm sections 46, 48, respectively, are positioned within the bore 104 (shown in FIGS. 4A, 4B) of the spring 102 with a gap 100 left in-between to allow for the coils of the spring to flex when the outer arm section is moved from the first configuration. A gap 100 having a length between ends 90, 96 within the range from about 1.25 inches to about 2.00 inches has been shown to provide satisfactory deflection, although other gap lengths are within the scope of the current invention. It will be readily apparent how the initial tension of spring 102 will produce a continuous biasing force which urges the outer arm section 48 into the predetermined position with respect to inner arm section 46 constituting the first configuration of the current invention.

In one embodiment of the current invention similar to that shown in FIG. 3, the float arm 34 has an overall length (from pivot point 51 to float 36) of about 13.25 inches and the float 36 has a length of about 4 inches. The inner arm section 46 has a length of about 4.75 inches, the outer arm section 48 has a length of about 6.75 inches, and the proximate ends 90, 96 of the arm sections are separated by a gap 100 having a length of about 1.75 inches. The hinge section 50 of this embodiment comprises a close wound cylindrical extension spring 102 having an initial tension within the range from about 5 pounds to about 7 pounds. The gauge of this embodiment is suitable for use in a LPG tank having a diameter of about 29.6 inches where the mounting axis 42 of the gauge is offset about 5.3 inches from the tank centerline. It will be readily appreciated, however, that different values for arm section length, initial tension and gap length can be used without departing from the scope of the current invention. The parameter values needed for other gauge/tank combinations can be readily determined by evaluating the geometry of the installation and weight of the components involved.

Referring still to FIG. 3, in the embodiment shown, the inner and outer float arm sections 46, 48 are formed from aluminum rod stock which provides the benefits of light weight and corrosion resistance. In this embodiment, the proximate ends 90, 96 of the arm sections 46, 48 are connected to the respective ends 92, 94 of the spring 102 by using a punch or similar device to crimp the spring ends (which are typically made of steel) down into the material of the arm sections. It will be readily apparent, however, that other methods of attachment can be used. For example, referring now to FIG. 4A, another embodiment of the current invention is shown in which the hinge section 50 also comprises a close wound cylindrical helical extension spring, denoted by reference number 106. A first circular groove 108 is formed on the outer arm section 48 near its inner end 96 and a second circular groove 108 is formed on the inner arm section 46 near its outer end 90. Wire segments 110 are formed on each end of the spring 106, each wire segment being bent inwardly into a region constituting a longitudinal extension of the cylindrical bore 104 of the spring. By temporarily flexing the wire segments 110 radially outwards, the inner and outer ends 96, 90, respectively of the outer and inner arm sections 48, 46 can be inserted into the bore 104 until the wire segments 110 snap into position within the circular grooves 108, thereby securing the arm sections 48, 46 to the spring 106. This attachment method can be used where the material for the float arm section 46, 48 is not suitable for the crimping method previously discussed, or where other considerations preclude the crimping of the spring directly onto the arm section ends.

Figures 4A, 4B:
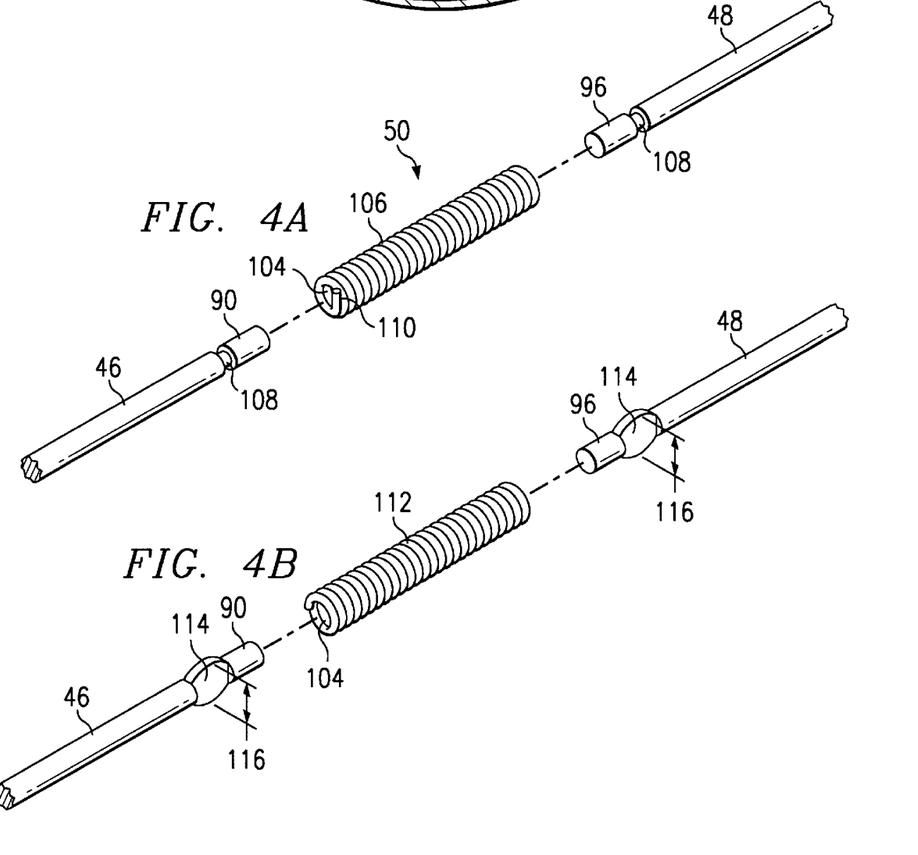
FIG. 4A is a perspective view of a portion of the float arm for another embodiment of the current invention, showing details of the hinge section with the components exploded away from one another.
FIG. 4B is a perspective view of a portion of the float arm for another embodiment of the current invention, showing details of the hinge section with the components exploded away from one another.

Referring now FIG. 4B, yet another embodiment of the current invention is shown wherein the hinge section 50 comprises a close wound cylindrical helical extension spring, denoted in this case by reference numeral 112. A first upset region 114 is formed near the inner end 96 of the outer arm section 48 and a second upset region 114 is formed near the outer end 90 of the inner float arm section 46. These upset regions 114 are formed on the arm sections by crimping or other methods known in the art. Each of the upset regions 114 has a maximum lateral dimension, denoted by reference number 116, which exceeds the diameter of the spring bore 104 when the spring 112 is in an unflexed condition. For attachment to the arm sections 46, 48, the ends of the spring 112 are forced over the ends 90, 96 of the float arm sections and the upset regions 114. The upset regions will radially flex the adjacent coils of the spring 112 and producing a bias force between the spring 112 and the upset regions 114 which secures the arm sections 46, 48 to the hinge section 50. In still other embodiments (not shown) of the current invention utilizing a coil spring in the hinge section 50, the spring can be connected to the ends 90, 96 of the arm sections 46, 48 by spot welding, brazing, soldering, adhesives or other attachment technology known in the art.

Figures 5A, 5B, 6, 7A, 7B:
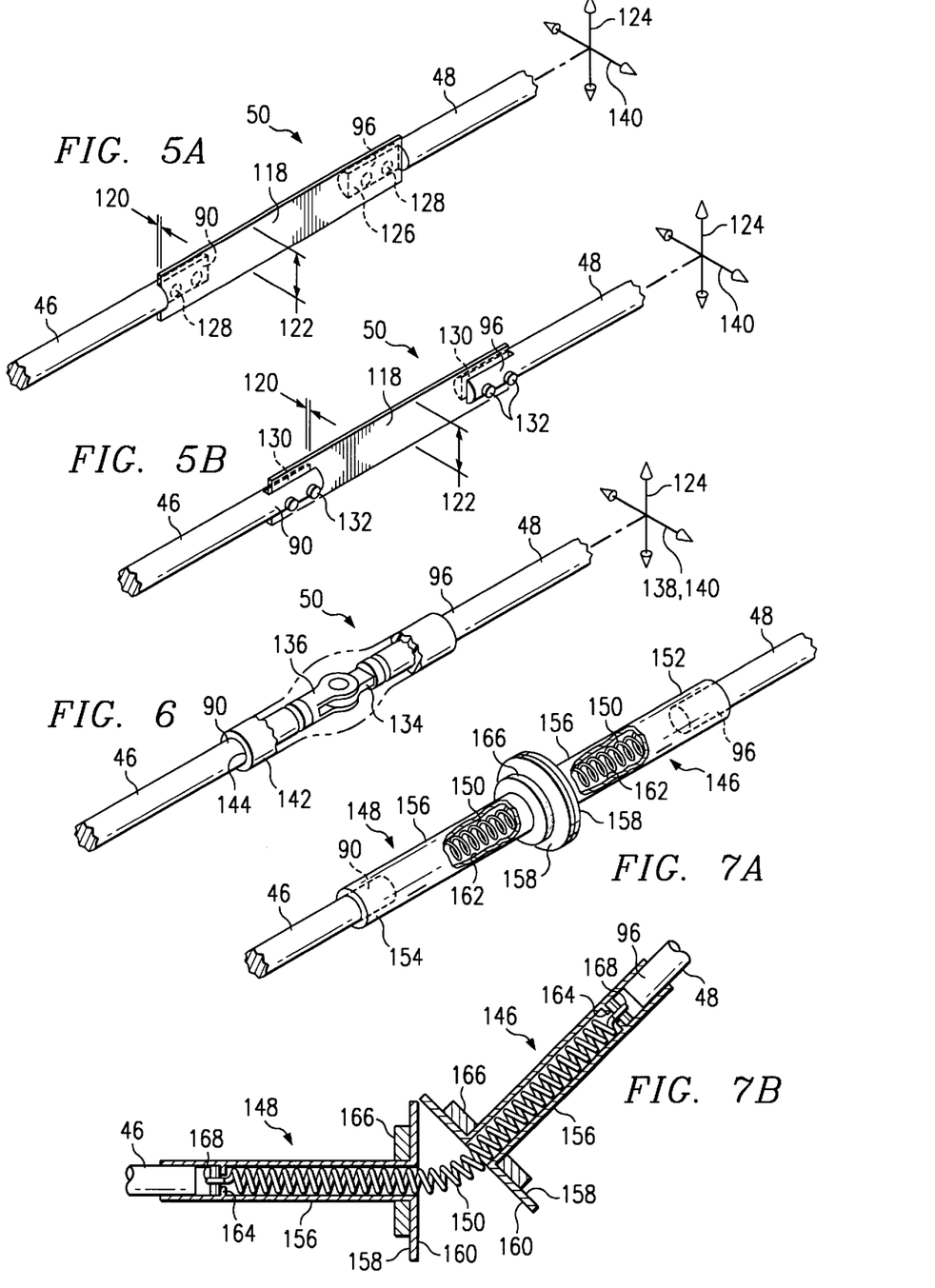
FIG. 5A is a perspective view of a portion of the float arm for yet another embodiment of the current invention, showing details of the hinge section.
FIG. 5B is a perspective view of a portion of the float arm for a further embodiment of the current invention, showing details of the hinge section.
FIG. 6 is a perspective view of a portion of the float arm for still another embodiment of the current invention, showing details of the hinge section.
FIG. 7A is a perspective view of a portion of the float arm for another embodiment of the current invention, with portions broken away showing details of the hinge section when in the undeflected position.
FIG. 7B is a cross-sectional side view of the float arm of FIG. 7A, showing the hinge section when in the deflected position.

Referring to FIGS. 5A and 5B, in yet further embodiments of the current invention, the hinge section 50 comprises a flat leaf spring 118. The spring 118 can be formed of spring steel, copper- or nickel-based spring alloy, glass- or carbon-reinforced epoxy composite material, or other spring materials known in the art. The spring 118 has a rectangular cross-section with a thickness 120 and a width 122, the thickness being substantially smaller than the width. For example, in one embodiment the spring 118 is made from spring steel material having a thickness 120 within the range of about 0.01 inches to about 0.02 inches and a width 122 within the range of about 0.10 inches to about 0.30 inches. The spring 118 is connected to the inner arm section 46 such that during use, the width 122 is oriented in a substantially vertical direction, as denoted by reference numeral 124. The differential between the magnitudes for thickness 120 and width 122 of the spring 118 will result in the spring 118 being relatively flexible in the horizontal direction 140 (i.e., perpendicular to the width 122) and relatively stiff in the vertical direction 124 (i.e., perpendicular to the thickness 120). The flexibility of the hinge section 50 in the horizontal direction 140 will allow the outer arm section 48 to deflect in the horizontal direction from its original position with respect to inner arm section 46 if an obstacle is encountered during installation of the gauge 20 into the tank, and the bias force produced by the deflected spring 118 will urge the outer arm section 48 back toward its original position. The stiffness of the hinge section 50 in the vertical direction 124 will ensure that no significant deflection occurs in the vertical position of the outer arm section 48 with respect to the inner arm section 46 such that the calibration and accuracy of the gauge is maintained.

Referring still to FIGS. 5A and 5B, the spring 118 can be connected to the float arm sections 46, 48 by any method known in the art. For example as shown in FIG. 5A, flat surfaces 126 can be formed on the ends 90, 96 of the arm sections and the spring 118 can be attached to these flat surfaces by means of welding, adhesives or other methods known in the art. In the embodiment shown in FIG. 5A, spot welds 128 are used. Referring now specifically to FIG. 5B, in still another alternative embodiment, a slot 130 can be formed in the end 90, 96 of the arm sections and the flat leaf spring 118 can be affixed in the slots using pins 132. While the preferred embodiments utilize flat surfaces 90 or slots 130 for connection of the spring 118 to the arm sections 46, 48, it will be readily appreciated that in other embodiments the spring could be connected directly to the otherwise unprepared arm section ends 90, 96 by welding, adhesives, or other mechanical means without departing from the scope of the current invention.

Referring now to FIG. 6, in still another alternative embodiment of the current invention, the hinge section 50 comprises a first hinge member 134 and a second hinge member 136 pivotally connected to one another to allow relative movement along a line of motion 138. The first hinge member 134 is connected to the inner end 96 of the outer arm section 48 and the second hinge member 136 is connected to the outer end 90 of the inner arm section 46. The hinge members 134, 136 are connected to the inner arm section 46 such that during use, the plane of motion 138 is oriented in a substantially horizontal direction, as denoted by line 140. To provide the required biasing force, the hinge section 50 of this embodiment further comprises an elastic member connected between the arm sections 46, 48 for urging the outer arm section 48 into the first configuration, i.e, into the predetermined position with respect to inner arm section 46. In the embodiment shown in FIG. 6, the elastic member comprises an elastomer sleeve 142 having a bore 144. The elastomer sleeve 142 is connected to the arm sections 46, 48 with the hinge members 134, 136 being positioned within the bore 144. It will be readily apparent that other structures can be used to provide the elastic member of this embodiment, for example, a cylindrical helical spring (not shown) could be used in place of the elastomer sleeve previously discussed. In yet another embodiment, a flat leaf spring connected between arm sections 46, 48 and running above, below or to one side of the hinge members 134, 136 could be used.

Referring now to FIGS. 7A and 7B, another embodiment of the current invention is shown, wherein hinge section 50 comprises first and second guide members 146, 148, respectively, and an elastic member 150 connected therebetween. The first guide member 146 is connected at a first end 152 to the inner end 96 of the outer arm section 48. The second guide member 148 is connected at a first end 154 to the outer end 90 of the inner arm section 46. Each guide member 146, 148 includes a longitudinally oriented body portion 156 and a terminal portion 158. The terminal portion 158 is disposed at a second end of each guide member 146, 148 and defines a mating surface 160 facing away from the body portion 156 and generally perpendicular to the longitudinal direction. Each guide member 146, 148 defines a passage 162 formed through the mating surface 160 and extending into the body portion 156 to an anchor point 164. The elastic member 150 has a first end 168 secured at the anchor point 164 of the first guide member 146, extends through the passages 162 in the first and second guide members, and has a second end 168 secured at the anchor point 164 of the second guide member 148. The elastic member 150 provides a biasing force for urging the mating surfaces 160 together in a juxtaposed arrangement. In the embodiment shown in FIGS. 7A and 7B, the elastic member 150 is a cylindrical helical extension spring held in tension when the mating surfaces 160 are juxtaposed. To further increase the biasing force urging the arm sections 46, 48 into the first configuration, one or more magnets 166 can be positioned adjacent to the terminal portions 158 of the guide members 146, 148 so as to produce a magnetic force attracting the mating surfaces 160 together when juxtaposed. If the guide members 146, 148 are made of ferrous metal or other magnetic materials, a single magnet 166 can provide the attractive force. If nonmagnetic materials such as aluminum or plastic are utilized for the guide members 146, 148, then at least two magnets 166 can be used, one magnet being positioned on each guide member as shown in FIG. 7B with their polarities arranged so as to provide an attractive force when the mating surfaces 160 are juxtaposed.

In operation, a gauge according to the current invention can be rotated rapidly during installation into a tank because if either the float or float arm encounters an obstacle as they move horizontally in the tank with the outer arm section in its predetermined first configuration, then the hinge section will deflect to allow the outer arm section to move into a second configuration that such that the obstacle can be cleared. After the obstacle is cleared, the biasing force provided by the spring section will rapidly cause the outer arm section to return to the first configuration such that the calibration and accuracy of the gauge will remain unchanged. Pivoting float-type gauges for screw-in installation are typically manufactured with a built-in stop which halts rotation of the gauge head during installation such that the float arm has a predetermined azimuth. This insures that the float arm will have an unobstructed vertical path after installation is complete.

It will be noted that while some embodiments of the current invention have a hinge section which deflects in the horizontal direction only, other embodiments can deflect in other directions in addition to the horizontal direction. When additional directions of deflection are provided, they serve to protect the gauge mechanism from transient stresses and shocks which can occur during transportation of the installed gauges.

It will be apparent that another aspect of the current invention is the hinged float arm itself, which can be incorporated into float-type gauges of any configuration as needed to allow the float arm to clear obstacles which block the movement of the float or float arm during installation of the gauge.

Thus, there is disclosed a float-type liquid level gauge that overcomes the shortcomings and disadvantages of the prior art gauges. While the foregoing embodiments of the invention have been disclosed with reference to a specific gauge structure, it is to be understood that many changes in detail may be made as a matter of design choices, without departing from the spirit and scope of the invention, as defined by the appended claims.

What is claimed is:

1. A liquid level gauge comprising:
   (a) a gauge head adapted for mounting to a portion of a liquid storing container;
   (b) a support arm rigidly connected to said gauge head and depending therefrom;
   (c) a float arm including an elongate inner arm section, an elongate outer arm section and a hinge section;
      said inner arm section being pivotally connected to said support arm for movement through an arc defining a first plane;
      said hinge section being connected at a first end to an outer end of said inner arm section and connected at an opposite end to an inner end of said outer arm section;
      said hinge section being deflectable to allow movement of said outer arm section between a first configuration in which said outer arm section is in a predetermined position with respect to said inner arm section and a second configuration in which said outer arm section is not in said predetermined position with respect to said inner arm section;
      said hinge section providing a biasing force for urging said outer arm section into said first configuration; and
   (d) a float connected to an outer end of said outer arm section, said float being buoyant so as to remain at the surface of a liquid.

2. A gauge according to claim 1, wherein said predetermined position constitutes said outer arm section being longitudinally aligned with said inner arm section.

3. A gauge according to claim 1, wherein said hinge section comprises a close wound cylindrical helical extension spring, said spring, when in an unflexed condition, defining a cylindrical bore and having an initial tension.

4. A gauge according to claim 3, wherein said outer end of said inner arm section and said inner end of said outer arm section are separated by a distance within a range of about 1.25 inches to about 2.00 inches.

5. A gauge according to claim 3, wherein said spring has an initial tension within a range of about 5 pounds to about 7 pounds.

6. A gauge according to claim 3, further comprising:
   a first circular groove formed on said outer arm section near said inner end;
   a second circular groove formed on said inner arm section near said outer end;
   wire segments formed on each end of said spring;
   each said wire segment being bent inwardly into a region constituting a longitudinal extension of said cylindrical bore of said spring; and
   said inner and outer ends, respectively, of said outer and inner arm sections being positioned within said bore and said wire segments being positioned within said first and second circular grooves so as to secure said arm sections to said hinge section.

7. A gauge according to claim 3, further comprising:
   upset regions formed near said inner end of said outer arm section and near said outer end of said inner float arm section;
   each said upset region having a maximum lateral dimension which exceeds the diameter of said spring bore when said spring is in said unflexed condition;
   portions of said arm sections including said upset regions being positioned within said spring bore, said upset regions radially flexing adjacent portions of said spring and producing a bias force between said spring and said upset regions, thereby securing said arm sections to said hinge section.

8. A gauge according to claim 1, wherein said hinge section comprises first and second guide members and an elastic member connected therebetween;
   said first guide member being connected at a first end to said inner end of said outer arm section;
   said second guide member being connected at a first end to said outer end of said inner arm section;
   each said guide member including a longitudinally oriented body portion and a terminal portion, said terminal portion being disposed at a second end of said body portion and defining a mating surface facing away from said body portion and generally perpendicular to said longitudinal direction;
   each said guide member defining a passage formed through said mating surface and extending into said body portion to an anchor point;
   said elastic member having a first end secured at the anchor point of said first guide member, extending through said passages in said first and second guide members, and having a second end secured at the anchor point of said second guide member;

said elastic member providing a biasing force for urging said mating surfaces into juxtaposition.

9. A gauge according to claim 8, wherein said elastic member is a cylindrical helical extension spring held in tension when said mating surfaces are juxtaposed.

10. A gauge according to claim 8, further comprising at least one magnet positioned adjacent to one of said terminal portions;
said magnet producing a magnetic force attracting said mating surfaces of said guide members together when said mating surfaces are juxtaposed.

11. A gauge according to claim 1, wherein said hinge section is only deflectable in predetermined directions, said predetermined directions not lying in said first plane.

12. A gauge according to claim 11, wherein said hinge section comprises a flat leaf spring;
said spring having a rectangular cross section with a thickness and a width, said thickness being smaller than said width, and said spring being connected to said inner arm section such that said width is oriented in a substantially vertical direction during use.

13. A gauge according to claim 12, wherein said spring includes ends which are connected to said ends of said arm sections with welds.

14. A gauge according to claim 12, wherein said spring includes ends which are connected to said ends of said float arm sections with pins.

15. A gauge according to claim 11, wherein said hinge section comprises:
a first hinge member and a second hinge member pivotally connected to one another to allow relative movement in a second plane;
said first hinge member being connected to said inner end of said outer arm section;
said second hinge member being connected to said outer end of said inner arm section such that said second plane is oriented in a substantially horizontal direction during use; and
an elastic member connected between said arm sections and providing a biasing force for urging said outer arm section into said first position.

16. A gauge according to claim 15, wherein said elastic member is a elastomer sleeve defining a bore;
said sleeve being connected to each said arm section;
said hinge members being positioned within said bore.

17. A gauge according to claim 15, wherein said elastic member is a cylindrical helical spring connected to each said arm section;
said hinge members being positioned within the bore of said spring.

18. A screw-in gauge for measuring the level of liquid in a tank, said gauge comprising:
(a) a gauge head having a threaded portion adapted for screw-in mounting into a threaded fitting of said tank, said threaded portion defining a mounting axis for said gauge;
(b) a support arm rigidly connected to said gauge head and depending therefrom into said tank along said mounting axis;
(c) a float arm including an elongate inner arm section, an elongate outer arm section and a hinge section;
said inner arm section being pivotally connected to said support arm for movement through an arc defining a first plane;
said hinge section being connected at a first end to an outer end of said inner arm section and connected at an opposite end to an inner end of said outer arm section;

said hinge section being deflectable in response to a force directed against said outer arm section along a line lying within a second plane which is perpendicular to said mounting axis;
said hinge section providing a biasing force for urging said outer arm section into a predetermined position with respect to said inner arm section; and
(d) a float connected to an outer end of said outer arm section, said float being buoyant so as to remain at the surface of said liquid.

19. A gauge according to claim 18, further comprising:
a drive shaft mounted in said support arm to allow rotation about the longitudinal axis of said shaft, said shaft having a first end disposed within a cavity formed in said gauge head and a second end disposed at the connection point of said float arm to said support arm;
a magnet fixed on said first end of said drive shaft to rotate with said shaft;
a first gear fixed on said second end of said drive shaft to rotate with said shaft;
a second gear fixed on said inner arm section of said float arm to pivot with said inner arm section; and
said first and second gears each having teeth which are operably engaged so that pivoting of said second gear produces a corresponding rotation of said first gear;
whereby angular movement of said inner arm section of said float arm with respect to said support arm produces rotational movement of said magnet.

20. A gauge according to claim 19, further comprising a magnetically-coupled indicator dial mounted on said gauge head, said dial including an indicator, said indicator being responsive to movement of said magnet within said gauge head;
whereby angular movement of said inner arm section of said float arm with respect to said support arm is indicated outside said tank by said indicator.

21. A float arm for a liquid level gauge having a support member and a float, said float arm comprising:
an elongate inner arm section having an inner end and an outer end, said inner end being adapted for pivotal connection to said support member;
a hinge section connected at a first end to said outer end of said inner arm section;
an elongate outer arm section having an inner end and an outer end, said inner end being connected to a second end of said hinge section and said outer end being adapted for connection to said float;
said hinge section being deflectable to allow movement of said outer arm section between a first configuration in which said outer arm section is in a predetermined position with respect to said inner arm section and a second configuration in which said outer arm section is not in said predetermined position with respect to said inner arm section;
said hinge section providing a biasing force for urging said outer arm section into said first configuration.

22. A float arm according to claim 21, wherein said hinge section comprises a close wound cylindrical helical extension spring, said spring, when in an unflexed condition, defining a cylindrical bore and having an initial tension.

23. A float arm according to claim 21, wherein said hinge section comprises first and second guide members and an elastic member connected therebetween;
said first guide member being connected at a first end to said inner end of said outer arm section;

said second guide member being connected at a first end to said outer end of said inner arm section;

each said guide member including a longitudinally oriented body portion and a terminal portion, said terminal portion being disposed at a second end of said body portion and defining a mating surface facing away from said body portion and generally perpendicular to said longitudinal direction;

each said guide member defining a passage formed through said mating surface and extending into said body portion to an anchor point;

said elastic member having a first end secured at the anchor point of said first guide member, extending through said passages in said first and second guide members, and having a second end secured at the anchor point of said second guide member;

said elastic member providing a biasing force for urging said mating surfaces into juxtaposition.

24. A float arm according to claim 21, wherein said hinge section is deflectable only in predetermined directions.

25. A float arm according to claim 24, wherein said hinge section comprises a single leaf flat spring;

said spring having a rectangular cross section with a thickness and a width, said thickness being smaller than said width, and said spring being connected to said inner arm section such that said width is oriented in a substantially vertical direction during use.

26. A float arm according to claim 24, wherein said hinge section comprises:

a first hinge member and a second hinge member pivotally connected to one another to allow relative movement in a plane;

said first hinge member being connected to said inner end of said outer arm section;

said second hinge member being connected to said outer end of said inner arm section such that said plane is oriented in a substantially horizontal direction during use; and an elastic member connected between said arm sections and providing a biasing force for urging said outer arm section into said first configuration.

\* \* \* \* \*